United States Patent
Okabe (10) Patent No.: US 9,917,473 B2
(45) Date of Patent: Mar. 13, 2018

(54) POWER SYSTEM, POWER MANAGEMENT METHOD, AND PROGRAM

(71) Applicant: NEC Corporation, Tokyo (JP)

(72) Inventor: Toshiya Okabe, Tokyo (JP)

(73) Assignee: NEC Corporation, Tokyo (JP)

( * ) Notice: Subject to any disclaimer, the term of this patent is extended or adjusted under 35 U.S.C. 154(b) by 259 days.

(21) Appl. No.: 14/771,259

(22) PCT Filed: Feb. 28, 2014

(86) PCT No.: PCT/JP2014/055026
§ 371 (c)(1),
(2) Date: Aug. 28, 2015

(87) PCT Pub. No.: WO2014/133123
PCT Pub. Date: Sep. 4, 2014

(65) Prior Publication Data
US 2016/0141916 A1 May 19, 2016

(30) Foreign Application Priority Data
Mar. 1, 2013 (JP) ................. 2013-040396

(51) Int. Cl.
*H02J 1/10* (2006.01)
*H02J 3/38* (2006.01)
*H02J 9/00* (2006.01)
*H02J 9/06* (2006.01)
*H02J 7/00* (2006.01)
*H02J 7/34* (2006.01)
*H02M 7/68* (2006.01)

(52) U.S. Cl.
CPC ............... *H02J 9/061* (2013.01); *H02J 7/00* (2013.01); *H02J 7/007* (2013.01); *H02J 7/0068* (2013.01); *H02J 7/34* (2013.01); *H02M 7/68* (2013.01)

(58) Field of Classification Search
CPC .. H02J 9/061; H02J 7/00; H02J 7/0068; H02J 7/007; H02J 7/34; H02M 7/68
USPC .......................................................... 307/23
See application file for complete search history.

(56) References Cited

U.S. PATENT DOCUMENTS

2011/0175452 A1* 7/2011 Hoshino ................. H02J 7/34
307/66

FOREIGN PATENT DOCUMENTS

| JP | 2009-159734 A | 7/2009 |
| JP | 2010-098862 A | 4/2010 |
| JP | 2011-091985 A | 5/2011 |

OTHER PUBLICATIONS

International Search Report corresponding to PCT/JP2014/055026, dated Apr. 1, 2014 (3 pages).

* cited by examiner

*Primary Examiner* — Carlos Amaya
(74) *Attorney, Agent, or Firm* — Wilmer Cutler Pickering Hale and Dorr LLP (57) ABSTRACT

A power system 10 is provided with a power conversion device 110 connected to an input power supply 200, a battery 120 and a load 130 connected in parallel with each other to the output side of the power conversion device 110, and a control device 140 controlling charging/discharging of the battery 120, wherein the control device 140 receives output power of the power conversion device 110, determines, based on the received output power, charge or discharge power of the battery 120 such that the output power becomes close to a first value, and charges or discharges the battery 120 based on the determined charge or discharge power.

6 Claims, 5 Drawing Sheets

POWER SYSTEM, POWER MANAGEMENT METHOD, AND PROGRAM

CROSS-REFERENCE TO RELATED APPLICATIONS

This application is a national stage application of International Application No. PCT/JP2014/055026 entitled "Power System, Power Management Method, and Program," filed on Feb. 28, 2014, which claims priority to Japanese Patent Application No. 2013-040396, filed on Mar. 1, 2013. The disclosures of each which are hereby incorporated by reference in their entirety.

TECHNICAL FIELD

The present invention relates to a power system, a power management system, and a program.

BACKGROUND ART

In recent years, various power systems using a commercial power source and a storage battery are widely used. In such a power system, the commercial power source and the storage battery are connected to each other via a power conversion device or the like that bi-directionally converts power between DC power and AC power. The commercial power source and the storage battery exchange power by use of the power conversion device. Many of the power conversion devices are designed to obtain the maximum power conversion efficiency when operating at a value close to the rated value. However, the operating state of the power conversion device may fluctuate due to various factors, such as consumed power of a load connected thereto. Therefore, the power conversion device cannot always operate at a value close to the rated value. In other words, the power conversion device may possibly operate at a value considerably smaller than the rated value, which could cause the risk of increasing the loss because the power conversion efficiency of the power conversion device considerably lowers.

Japanese published application 1 discloses an example of a technology of reducing the loss at the time of power conversion by power conversion devices. An AC power supply device disclosed in Japanese published application 1 has a plurality of DC-AC inverters.
The AC power supply device selects the combination of the plurality of DC-AC inverters to maximize the power conversion efficiency of each of the DC-AC power inverter based on the relationship between the output power and the conversion efficiency of each of the DC-AC inverters. Thereby the AC power supply device can reduce the loss of each of the DC-AC inverters at the time of power conversion.

CITATION LIST

Patent Literature

[Patent literature 1]: Japanese Laid-Open Patent Publication No. 2010-98862

SUMMARY OF INVENTION

Technical Problem

However, the technique disclosed in Japanese published application 1 needs complicated configurations, such as a plurality of inverters and a plurality of switches for switching the inverters. Therefore, the controls may be complicated or the manufacturing cost or the product size may be increased.

The objective of the present invention is to provide a power system, a power management method, and a program that can achieve the reduction in the loss at the time of power conversion by simple configurations.

Solution to Problem

According to the present invention, provided is a power system including:
a power conversion device that is connected to an input power supply;
a battery and a load that are connected in parallel with each other to an output side of the power conversion device; and
a control unit that controls charging or discharging of the battery, wherein the control unit:
receives output power of the power conversion device;
determines, based on the received output power, charge or discharge power of the battery such that the output power becomes close to a first value; and
charges or discharges the battery based on the determined charge or discharge power.

According to the present invention, provided is a power management method including preparing:
a power conversion device that is connected to an input power supply;
a battery and a load that are connected in parallel with each other to an output side of the power conversion device; and
a controller that controls charging or discharging of the battery, wherein the controller:
receives output power of the power conversion device;
determines, based on the received output power, charge or discharge power of the battery such that the output power becomes close to a first value; and
charges or discharges the battery based on the determined charge or discharge power.

According to the present invention, provided is a program executed by a controller in a power system including:
a power conversion device that is connected to an input power supply;
a battery and a load that are connected in parallel with each other to an output side of the power conversion device; and
the controller that controls charging or discharging of the battery, wherein the program causes the controller to achieve functions of:
receiving output power of the power conversion device;
determining, based on the received output power, charge or discharge power of the battery such that the output power becomes close to a first value; and
charging or discharging the battery based on the determined charge or discharge power.

Advantageous Effects of Invention

According to the present invention, the loss at the time of power conversion by a power conversion device can be reduced by simple configurations.

BRIEF DESCRIPTION OF DRAWINGS

The above and other objects, features and advantages will be more apparent from the following preferred exemplary embodiments and the accompanying drawings described below.

DESCRIPTION OF EMBODIMENTS

The exemplary embodiments of the present invention will be described below with reference to the accompanying drawings. In the drawings, the same reference numerals are given to the same components, and the description thereof will be appropriately omitted.
(Exemplary Embodiment)

Figure 1:
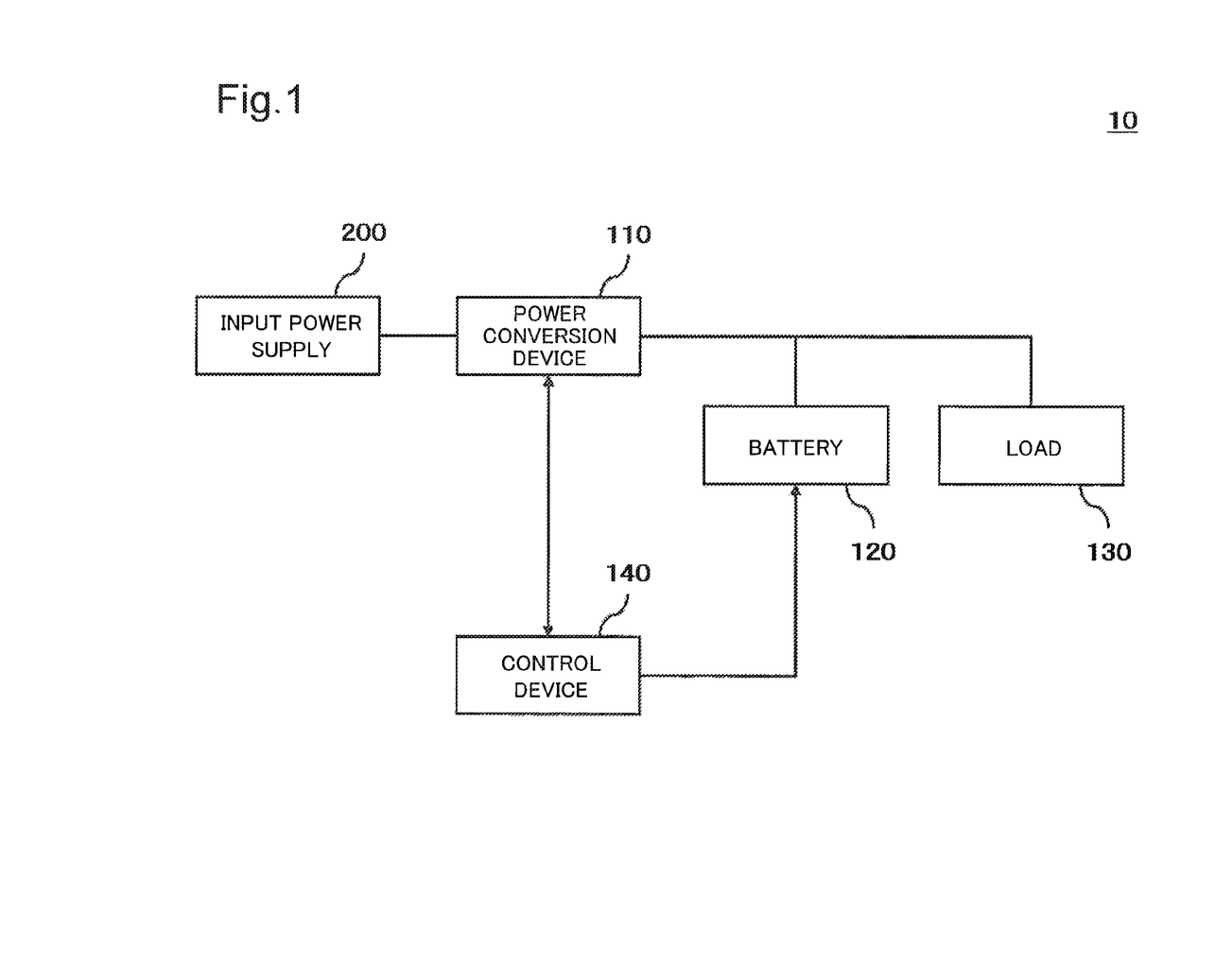
FIG. 1 is a block diagram illustrating a configuration example of a power system according to the present invention.

FIG. 1 is a block diagram illustrating a configuration example of a power system 10 according to the present invention. In FIG. 1, the power system 10 includes a power conversion device 110, a battery 120, a load 130, and a controller (control unit) 140.

The power conversion device 110 converts the power supplied from an input power supply 200. The power conversion device 110 is, for example, an alternating current (AC)-direct current (DC) inverter, a DC-DC converter, and an AC-AC converter. The power conversion device 110 may be configured by using the plurality of inverters and converters. Furthermore, the power conversion device 110 may be configured for unidirectional power conversion. Alternatively, the power conversion device 110 may be configured for bidirectional power conversion.

The battery 120 serves to adjust the power passing through the power conversion device 110 and bring the power close to a first value. Specifically, in the case where the battery 120 is being charged, the power passing through the power conversion device 110 equals to a value obtained by adding the charging power of the battery 120 to the power consumed by the load 130. On the other hand, in the case where the battery 120 is being discharged, the power passing through the power conversion device 110 equals to a value obtained by subtracting the discharging power of the battery 120 from the power consumed by the load 130. In this manner, the power passing through the power conversion device 110 is adjusted by controlling the charging or discharging operations of the battery 120. Incidentally, the controller 140 as describe below may control the charging or discharging operations of the battery 20.

The load 130 is an electric appliance that operates using the power supplied from the input power supply 200 or the power stored in the battery 120. Concrete examples of the load 130 include household electric appliances, electric vehicles (EV), and plug-in hybrid vehicles (PHV). Although not shown, a plurality of loads 130 may be connected.

The controller 140 controls the charging or discharging operations of the battery 120. Particularly, the controller 140 controls the charging or discharging operations of the battery 120 based on the output power of the power conversion device 110, for bringing the output power of the power conversion device 110 close to a first value. The term "first value" herein refers to a value that enhances the power conversion efficiency of the power conversion device 110. In addition, the term "first value" preferably refers to a value that maximizes the power conversion efficiency of the power conversion device 110. For example, the rated value of the power conversion device 110 is adopted as a first value. The first value may be set, for example, in the controller 140 in advance. Alternatively, the first value may be received from a storage unit in the controller 140 or a storage unit in an external device (not shown) that is connected to the controller 140 in a communicable manner. Further, the first value may be set so as to include a certain range, for example, a range of 5% above and 5% below the rated value. When the output power of the power conversion device 110 is smaller than the first value, the controller 140 charges the battery 120. In this case, the battery 120 functions as a load. This can increase the output power of the power conversion device 110 and bring the output power close to the first value. When the output power of the power conversion device 110 is larger than the first value, the controller 140 discharges the battery 120. In this case, the battery 120 functions as an auxiliary power supply. This can decrease the output power of the power conversion device 110 and bring the output power close to the first value.

The controller 140 illustrated in FIG. 1 is implemented by arbitrary combinations of hardware and software, mainly, by combinations of a CPU in an arbitrary computer, a memory, a program loaded in the memory to implement the components in FIG. 1, a storage medium, such as a hard disk for storing the program, and an interface for network connection. Various modifications are available as a method and a device for implementing the same.

Figure 2:
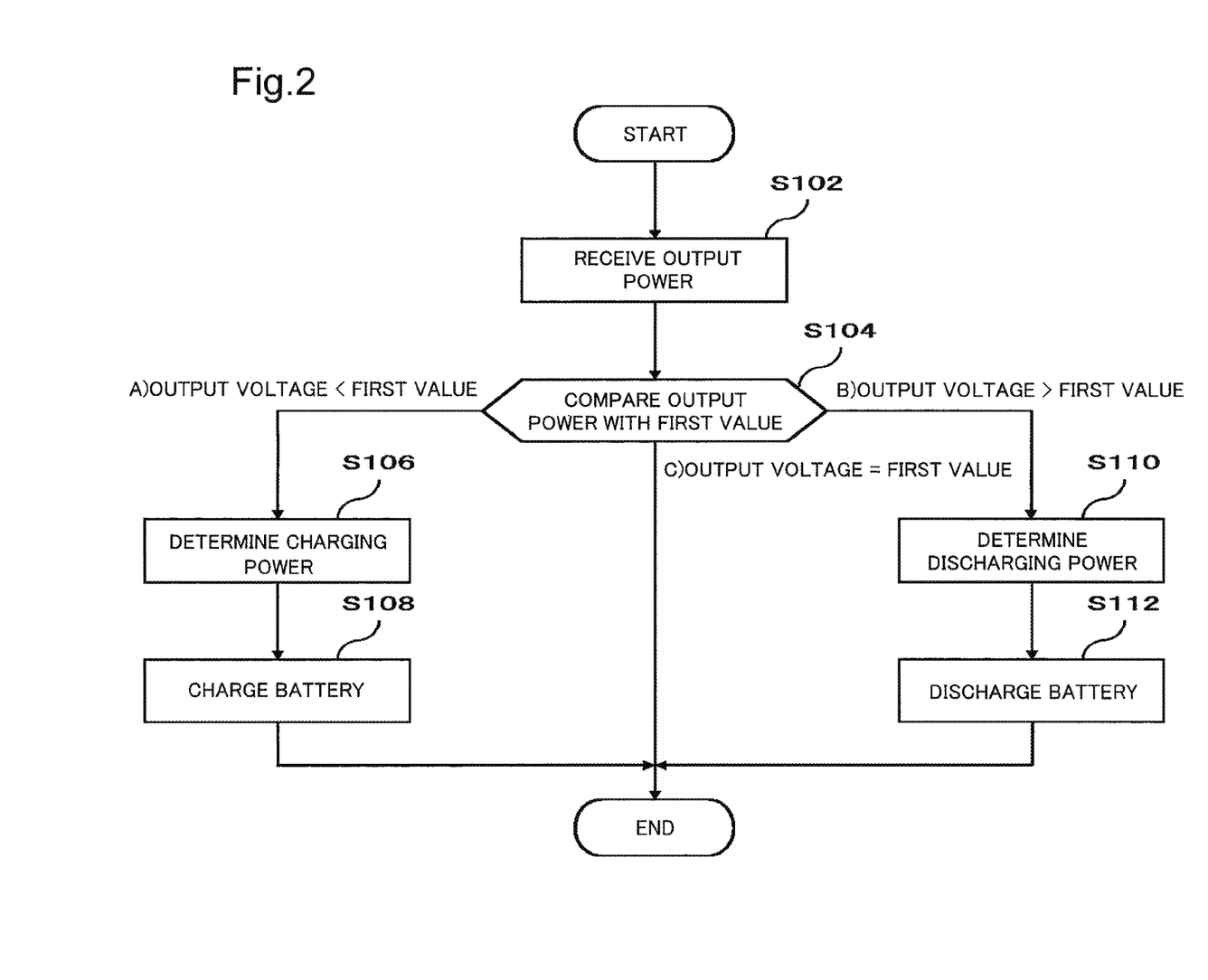
FIG. 2 is a flowchart illustrating a processing flow for a power system according to the present invention.

An example of operations of the power system 10 according to the present exemplary embodiment will be described referring to FIG. 2. FIG. 2 is a flowchart illustrating a processing flow for the power system 10 according to the present invention.

Figure 3:
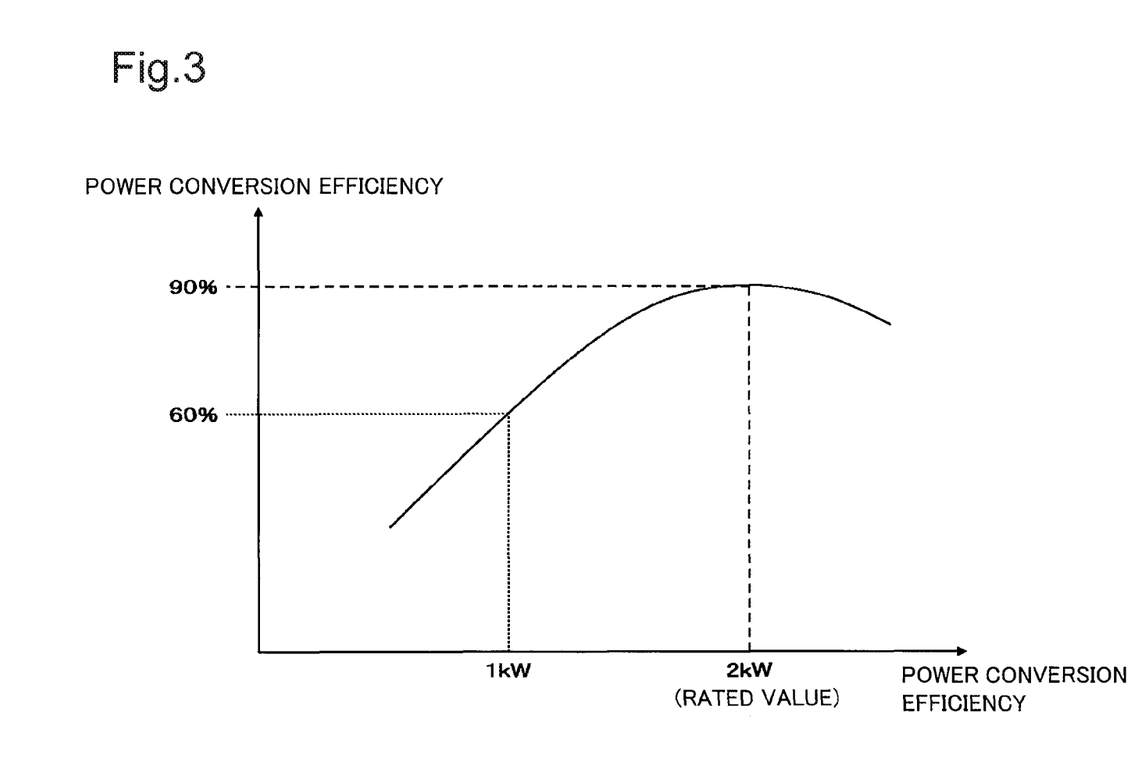
FIG. 3 is a diagram illustrating an example of the relationship between the output power and the power conversion efficiency of a power conversion device.

The controller 140 receives the output power of the power conversion device 110 periodically, for example, every one second (S102). The controller 140 then compares the output power of the power conversion device 110 received at S102 to a first value (S104). Incidentally, the relationship between the output power and the power conversion efficiency of the power conversion device 110 is shown in FIG. 3. FIG. 3 illustrates an example of the relationship between the output power and the power conversion efficiency of a power conversion device 110. In this case, the rated value (2 kW) of the power conversion device 110 is adopted as a first value.

When the output power is smaller than the first value (S104: A) as a result of the comparison, the controller 140 executes the charging processing of the battery 120. Particularly, firstly, the controller 140 determines the charging power of the battery 120 (S106). Here, the controller 140 determines the charging power of the battery 120 based on a difference between the output power of the power conversion device 110 received at S102 and the first value. Assume that a first value of the power conversion device 110 is 2 kW, and output power of the power conversion device 110 received at S102 is 1 kW, for example. The controller 140 charges the battery 120 at 1 kW, thereby enabling the output of the power conversion device 110 to increase to the first value of 2 kW. Thus, in this case, the controller 140 determines the charging power of the battery 120 to be 1 kW. The controller 140 then starts the charging processing of the battery 120 based on the charging power determined at S106 (S108).

When the output power is larger than the first value (S104: B) as a result of the comparison, the controller 140 executes the discharging processing of the battery 120. Particularly, firstly, the controller 140 determines the discharging power of the battery 120 (S110). Here, the controller 140 determines the discharging power of the battery 120 based on a difference between the output power of the power conversion device 110 received at S102 and the first value. Assume that a first value of the power conversion device 110 is 2 kW, and output power of the power conversion device 110 received at S102 is 2.5 kW, for example. The controller 140 discharges the battery 120 at 0.5 kW, thereby enabling the output of the power conversion device 110 to decrease to the first value of 2 kW. Thus, in this case, the controller 140 determines the discharging power of the battery 120 to be 0.5 kW. The controller 140 then starts the discharging processing of the battery 120 based on the discharging power determined at S110 (S112).

Further, when the output power is equal to the first value (S104: C) as a result of the comparison, the power conversion efficiency of the power conversion device 110 is at the maximum. Therefore, the controller 140 does not execute the charging or discharging processing of the battery 120.

As described above, in the present exemplary embodiment, the controller 104 compares the output power of the power conversion device 110 to a first value that maximizes the power conversion efficiency of the power conversion device 110. The charging or discharging processing of the battery 120 is executed corresponding to the results of the comparison. Particularly, when the output power of the power conversion device 110 is smaller than the first value, the charging processing of the battery 120 is executed. When the output power of the power conversion device 110 is larger than the first value, the discharging processing of the battery 120 is executed. Consequently, according to the present exemplary embodiment, the power conversion efficiency of the power conversion device 110 is brought close to the maximum value and the loss at the time of power conversion is reduced. In addition, according to the present exemplary embodiment, the loss at the time of the power conversion can be reduced by simple configurations without adopting complicated configurations and the like that have a plurality of power conversion devices, the combination of which is selected such that the power conversion efficiency becomes the maximum.

As has been described above by referring to the drawings, the exemplary embodiment of the present invention is illustrative of the invention, and the various configurations other than the above can be adopted.

Figure 4:
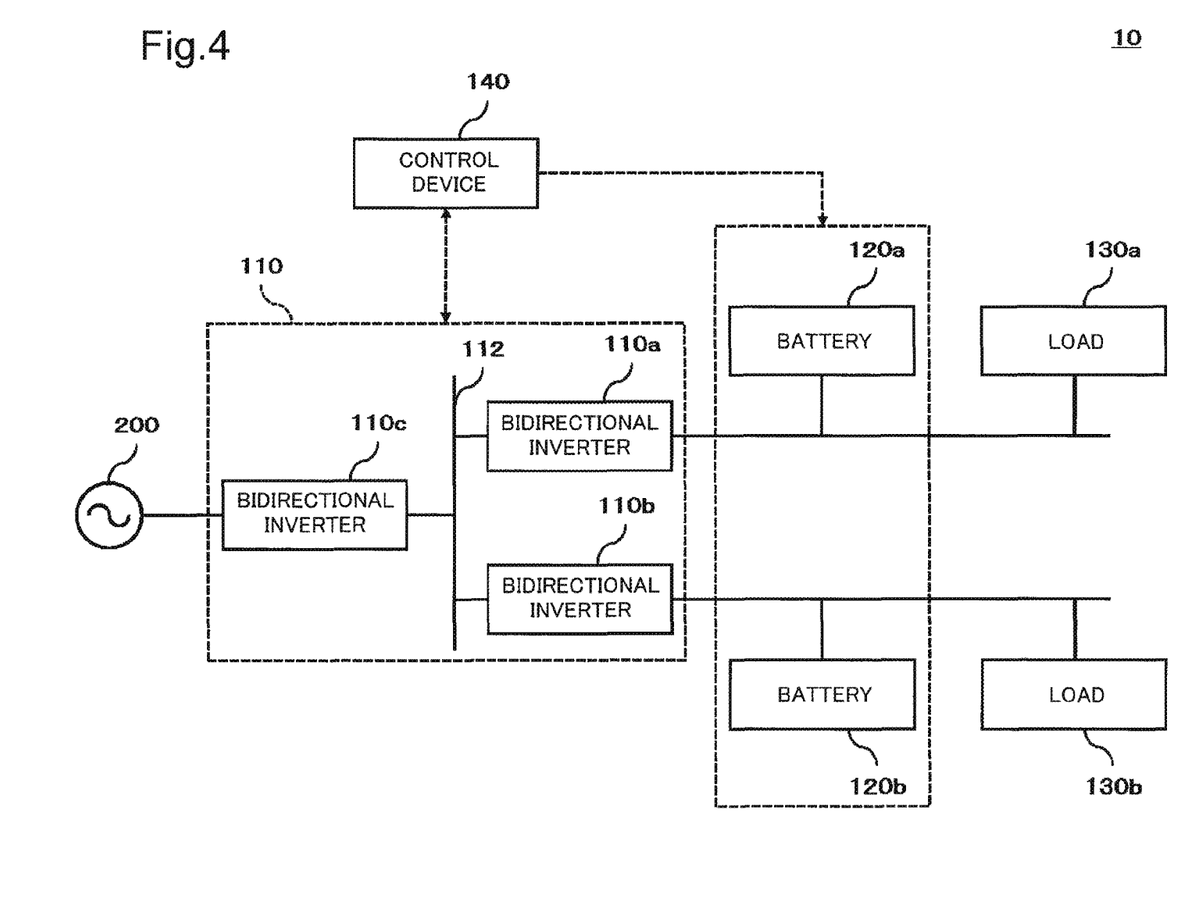
FIG. 4 is a block diagram illustrating another configuration example of a power system according to the present invention.

For example, a configuration as in FIG. 4 can be adopted. FIG. 4 is a block diagram illustrating another configuration example of a power system 10 according to the present invention. The power system shown in FIG. 4 includes a bidirectional inverter 110c that is connected to an AC input power supply 200, bidirectional inverters 110a and 110b that are connected in parallel with each other to the bidirectional inverter 110c via a DC bus 112, a battery 120a and a load 130a that are connected in parallel with each other to the bidirectional inverter 110a, a battery 120b and a load 130b that are connected in parallel with each other to the bidirectional inverter 110b, and a controller 140 that controls the charging or discharging operations of the batteries 120a and 120b. Incidentally, the bidirectional inverters 110a to 110c in FIG. 4 correspond to the power conversion device 110 in the above-described exemplary embodiment. The controller 140 receives the output power of each of the bidirectional inverters 110a to 110c. The controller 140 determines, based on the output power of each of the bidirectional inverters 110a to 110c, the battery to be control the charging or discharging operation from one of the batteries 120a and 120b.

Here, consider an example in which the bidirectional inverters 110a to 110c show the characteristic as shown in FIG. 3 and only the load 130b is consuming a power of 1 kW. In this case, the output power of each of the bidirectional inverters 110b and 110c becomes 1 kW, and the bidirectional inverter 110a is not used. Therefore, the controller 140 operates to charge the battery 120b at 1 kW such that the output power of each of the bidirectional inverters 110b and 110c is brought close to the rated value of 2 kW. Consequently, the power conversion efficiency of the entire power system 10 is enhanced.

Further, consider another example in which the load 130a is consuming a power of 1 kW and the load 130b is consuming a power of 2 kW. In this case, the output power of bidirectional inverter 110a becomes 1 kW, the output power of the bidirectional inverter 110b becomes 2 kW, and the output power of the bidirectional inverter 110c becomes 3 kW. Here, since the output power of the bidirectional inverter 110a is smaller than the first value, the output power needs to be increased. On the other hand, since the output power of the bidirectional inverter 110c is larger than the first value, the output power needs to be decreased. Therefore, the controller 140 charges the battery 120a at 1 kW and discharges the battery 120b at 2 kW. In such a manner, the output power of each of the bidirectional inverters 110a and 110c becomes the rated value of 2 kW, and the power conversion efficiency is enhanced. The bidirectional inverter 110b is not used since the load 130b operates by only the power supplied from the battery 120b. Consequently, the power conversion efficiency of the entire power system 10 is enhanced.

As described above, the advantageous effect similar to the above-described exemplary embodiment can be obtained even by adopting the configuration as in FIG. 4.

Figure 5:
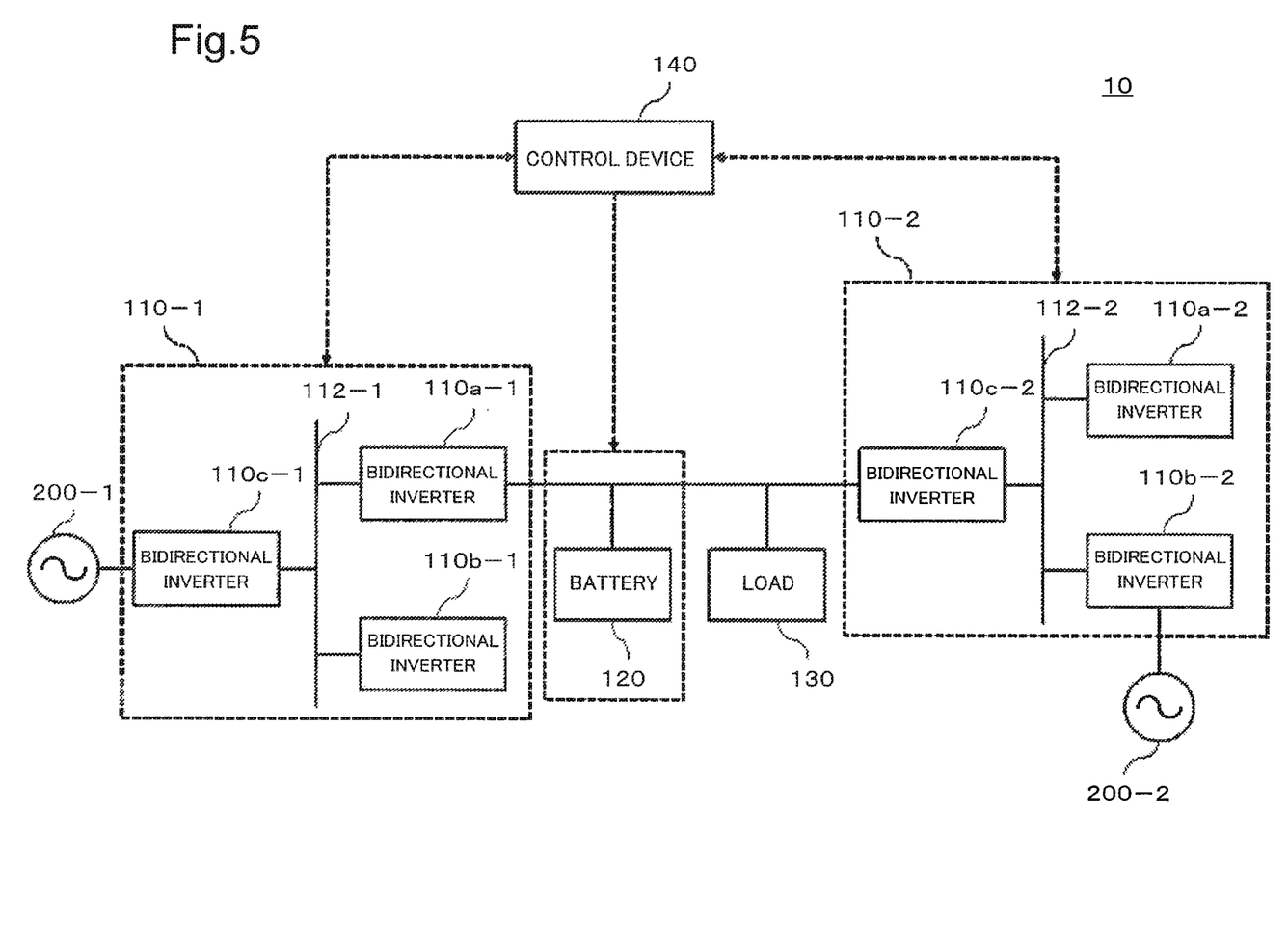
FIG. 5 is a block diagram illustrating another configuration example of a power system according to the present invention.

In addition, a configuration as in FIG. 5 can be adopted as another example. FIG. 5 is a block diagram illustrating another configuration example of a power system 10 according to the present invention.

The power system 10 in the example of FIG. 5 includes a plurality of power conversion devices 110 (a power conversion device 110-1 and a power conversion device 110-2). The power conversion device 110-1 converts power exchanged between the power conversion device 110-1 and an input power supply 200-1, and the power conversion device 110-2 converts power exchanged between the power conversion device 110-2 and an input power supply 200-2. Further, the power conversion device 110-1 and the power conversion device 110-2 are connected to each other via bidirectional inverters, and power can be exchanged between the power conversion device 110-1 and the power conversion device 110-2. Incidentally, a configuration of the power system 10 which includes the plurality of power conversion devices 110 is not limited to the configuration in FIG. 5.

According to the example shown in FIG. 5, the power conversion device 110-1 can be operated with use of the power supplied from the power conversion device 110-2 and a battery 120 at high power conversion efficiency. According to the example shown in FIG. 5, the power conversion device 110-2 can be operated with use of the power supplied from the power conversion device 110-1 and the battery 120 at high power conversion efficiency. The description below exemplifies a case where the power conversion device 110-1 is operated with use of the power supplied from the power conversion device 110-2 and the battery 120 at high power conversion efficiency. Incidentally, in the present example, assume that a first value of the power conversion device 110-1 is 1 kW and a first value of the power conversion device 110-2 is 2 kW. As described above, the first value is preferably a value that maximizes the power conversion efficiency, and the rated values of the respective power conversion devices 110 are adopted as respective first values, for example.

Here, a load 130 is consuming a power of 2.5 kW. If the power consumed is covered by only the power from the power conversion device 110-1, the electric power output value of the power conversion device 110-1 deviates from the first value (1 kW), thereby lowering the power conversion efficiency. Thus, a controller 140 causes the output power of the power conversion device 110-1 to be close to the first value by using the power conversion device 110-2 or the battery 120 as an auxiliary power supply. Specifically, the controller 140 causes the power conversion device 110-2 or the battery 120 to output a power of 1.5 kW, which is a difference between the power consumed (2.5 kW) and the first value of the power conversion device 110-1 (1 kW). Thus the controller 140 brings the output power of the power conversion device 110-1 close to the first value of 1 kW.

Here, in the case where the input power supply 200-2 is a power generation device that can generate power with no cost by using natural energy, such as solar light, and therefore the power conversion efficiency of the power conversion device 110-2 need not be particularly taken into consideration, the controller 140 uses the power conversion device 110-2 alone or both the power conversion device 110-2 and the battery 120 to output a power of 1.5 kW in total. In such a manner, the power conversion device 110-1 can be operated at the first value by which the power conversion efficiency becomes high, and the power conversion efficiency of the entire power system 10 can be enhanced.

In the case where the power conversion efficiency of the power conversion device 110-2 need be taken into consideration, the controller 140 charges or discharges the battery 120 such that the output value of the power conversion device 110-2 is also brought close to the first value. Specifically, the controller 140 performs control such that the battery 120 is charged at 0.5 kW and the power necessary as a whole is adjusted to 3 kW, and that the power conversion device 110-1 and the power conversion device 110-2 supply a power of 1 kW and 2 kW, respectively. In such a manner, both of the power conversion device 110-1 and the power conversion device 110-2 can be operated at a power of the first values. Consequently, the power conversion efficiency of the entire power system 10 can be enhanced.

In the case where power is exchanged between the power conversion device 110-1 and the power conversion device 110-2, the power conversion efficiency can be enhanced. Particularly, when the battery 120 is chargeable or dischargeable, the controller 140 charges or discharges the battery 120 at the charge power or the discharge power based on a difference between the first value of the power conversion device 110-1 and the first value of the power conversion device 110-2. In this manner, both of the power conversion device 110-1 and the power conversion device 110-2 can be operated at a power close to the respective first values by which the power conversion efficiencies become high.

In the case where the battery 120 is discharged at the time of power exchange between the power conversion device 110-1 and the power conversion device 110-2, the controller 140 may control to the battery 120 by the power supplied from the power conversion device 110 on the power supply side after the completion of the power exchange, thereby compensating for the power discharged from the battery 120.

As a concrete example, consider a case where the power conversion device 110-1 transfers an electric energy of 2 kWh to the power conversion device 110-2. In this case, the controller 140 determines the charge power or the discharge power of the battery 120 based on the first value 1 kW of the power conversion device 110-1 and the first value 2 kW of the power conversion device 110-2. Particularly, when the supplying-side power conversion device 110-1 is operated at a power of 1 kW, which is the first value of the power conversion device 110-1, the supplied-side power conversion device 110-2 is in short of power by 1 kW with respect to 2 kW, which is the first value of the power conversion device 110-2. Therefore, the power conversion efficiency of the power conversion device 110-2 is not satisfactorily obtained. Then, the controller 140 discharges the battery 120 at 1 kW and supplies the power to the power conversion device 110-2 in order to operate the power conversion device 110-2 at a power of the first value. In this manner, a power of 2 kW is supplied to the power conversion device 110-2, the power being obtained by adding the discharging power 1 kW from the battery 120 to the power 1 kW from the power conversion device 110-1. The controller 140 keeps this state for 1 hour, thereby transferring an electric energy of 2 kWh to the power conversion device 110-2. After transferring the electric energy to the power conversion device 110-2, the controller 140 charges the battery 120 in order to compensate for the power discharged from the battery 120. Specifically, the controller 140 causes the power conversion device 110-1 to output a power of 1 kW to the battery 120 and the battery 120 is charged for 1 hour. Therefore, the power consumed by the battery 120 in the course of power transfer can be compensated for. In this manner, both of the power conversion device 110-1 and the power conversion device 110-2 can be operated at a power of the respective first values by which the power conversion efficiencies become high, and the power conversion efficiency of the entire power system 10 can be enhanced.

As another example, consider a case where the power conversion device 110-2 transfers an electric energy of 2 kWh to the power conversion device 110-1. In this example, when the supplying-side power conversion device 110-2 is operated at a power of 2 kW, which is the first value of the power conversion device 110-2, the supplied-side power conversion device 110-1 is in excess of power by 1 kW with respect to 1 kW, which is the first value of the power conversion device 110-1. Therefore, the power conversion efficiency of the power conversion device 110-2 is not satisfactorily obtained. Then, the controller 140 charges the battery 120 by using the excess power of 1 kW in order to operate the power conversion device 110-1 at a power of the first value. In this manner, a power of 1 kW is supplied to the power conversion device 110-1, the power being obtained by subtracting the charging power of 1 kW to the battery 120 from a power of 2 kW from the power conversion device 110-2. The controller 140 keeps this state for 2 hours, thereby transferring an electric energy of 2 kWh to the power conversion device 110-1. In this manner, both of the power conversion device 110-1 and the power conversion device 110-2 can be operated at a power of the respective first values by which the power conversion efficiencies become high, and the power conversion efficiency of the entire power system 10 can be enhanced.

FIG. 5 exemplifies the case where the two power conversion devices 110 are connected. However, not only the case above, but also a case in which three or more power conversion devices 110 are connected enables the similar advantageous effect to be obtained.

In the example in FIG. 5, the following invention is disclosed. Namely, disclosed is a power system including:

a plurality of power conversion devices that are individually connected to different input power supplies;

a battery and a load that are connected in parallel to each other between the plurality of power conversion devices; and a control unit that controls charging or discharging of the battery, wherein the control unit:

receives operation power of the power conversion devices for each of the plurality of power conversion devices;

determines charge or discharge power of the battery such that the operation power for each of the power conversion devices becomes close to a first value of each of the plurality of the power conversion devices based on the received operation power; and charges or discharges the battery based on the determined charge or discharge power.

In addition, a plurality of batteries 120 may be included in the above-described exemplary embodiment. Adopting the configuration having the plurality of batteries 120 widens the range of power adjustable by charging or discharging operations.

In the flowchart used in the above description, a plurality of steps (processing) are described in order, but the order of the steps executed in each of the exemplary embodiments is not limited to the order of the above description. In each of the exemplary embodiments, modifications can be made on the order of the illustrated steps within the scope not interfering with the contents thereof.

Referential examples are appended as follows.

1. A power system including:
   a power conversion device that is connected to an input power supply;
   a battery and a load that are connected in parallel with each other to an output side of the power conversion device; and
   a control unit that controls charging or discharging of the battery, wherein the control unit:
      receives output power of the power conversion device;
      determines the charge power or the discharge power of the battery such that the output power becomes close to a first value based on the received output power; and
      charges or discharges the battery based on the determined charge or discharge power.

2. The power system according to example 1., wherein the controller:
   charges the battery when the output power of the power conversion device is smaller than the first value; and
   discharges the battery when the output power of the power conversion device is larger than the first value.

3. The power system according to example 1. or 2., wherein
   the first value is adjusted to a value that maximizes a power conversion efficiency of the power conversion device.

4. A power management method including preparing:
   a power conversion device that is connected to an input power supply;
   a battery and a load that are connected in parallel with each other to an output side of the power conversion device; and
   a controller that controls charging or discharging of the battery, wherein the controller:
      receives output power of the power conversion device;
      determines charge power or discharge power of the battery such that the output power becomes close to a first value based on the received output power; and
      charges or discharges the battery based on the determined the charge power or discharge power.

5. A program executed by a controller in a power system including:
   a power conversion device that is connected to an input power supply;
   a battery and a load that are connected in parallel with each other to an output side of the power conversion device; and
   the controller that controls charging or discharging of the battery, wherein the program causes the controller to achieve functions of:
      receiving output power of the power conversion device;
      determining charge power or discharge power of the battery such that the output power becomes close to a first value based on the received output power; and
      charging or discharging the battery based on the determined charge or discharge power.

6. The power management method according to example 4., including the controller:
   causing the battery to be charged when the output power of the power conversion device is smaller than the first value; and
   causing the battery to be discharged when the output power of the power conversion device is larger than the first value.

7. The power management method according to example 4. or 6., including that
   the first value is adjusted to a value that maximizes a power conversion efficiency of the power conversion device.

8. The program according to example 5., causing the controller to achieve functions of:
   charging the battery when the output power of the power conversion device is smaller than the first value; and
   discharging the battery when the output power of the power conversion device is larger than the first value.

9. The program according to example 5. or 8., wherein
   the first value is adjusted to a value that maximizes a power conversion efficiency of the power conversion device.

This application claims priority based on Japanese Patent Application No. 2013-040396, filed on Mar. 1, 2013, the entire disclosure of which is incorporated herein.

The invention claimed is:

1. A power system comprising;
   a power conversion device configured to perform power conversion between a power source and a load that is connected to an output side of the power conversion device and that consumes an electric power;
   a battery configured to perform a charging operation and a discharging operation, wherein the battery is connected to the output side of the power conversion device in parallel with the load; and
   a controller configured to receive an output power of the power conversion device and to control the charging operation or the discharging operation of the battery, such that output power of the power conversion device comes close to a rated value that maximizes a power conversion efficiency of the power conversion device,
   wherein when the output power of the power conversion device is smaller than the rated value, the controller determines a charging power to the battery based on a difference between the output power of the power conversion device and the rated value, and starts the charging operation of the battery based on the determined charging power, and wherein when the output power of the power conversion device is larger than the rated value, the controller determines a discharging power from the battery based on a difference between the output power of the power conversion device and the rated value, and starts the discharging operation of the battery based on the determined discharging power.

2. The power system according to claim 1, wherein the power conversion device comprises:

a first bidirectional inverter to which a first battery and a first load are connected in parallel with each other at an output side of the first bidirectional inverter;

a second bidirectional inverter to which a second battery and a second load are connected in parallel with each other at an output side of the second bidirectional inverter; and a third bidirectional inverter to which the first bidirectional inverter and the second bidirectional inverter are connected in parallel with each other at an output side of the third bidirectional inverter via a bus, and a power supply source at an input side of the third bidirectional inverter, wherein the controller receives an output power of each of the first bidirectional inverter, the second bidirectional inverter, and the third bidirectional inverter, and controls a charging operation or a discharging operation of each of the first battery and the second battery based on the output power of each of the first bidirectional inverter, the second bidirectional inverter, and the third bidirectional inverter, such that the output power of each of the first bidirectional inverter, the second bidirectional inverter, and the third bidirectional inverter comes close to the rated value of each of the first bidirectional inverter, the second bidirectional inverter, and the third bidirectional inverter, respectively, and wherein a value of the output power of the third bidirectional inverter is a total value of the output powers of the first bidirectional inverter and the second bidirectional inverter.

3. A power system, comprising:

a first power conversion device and a second power conversion device, each of the first and the second power conversion devices being connected to different power supply source, and each of the first and second power conversion devices being connected to each other and configured to exchange power with each other;

a battery and a load connected in parallel with each other between the first power conversion device and the second power conversion device, and configured to use the output power of each of the first and second power conversion devices; and a controller configured to receive the output power of each of the first power conversion device and the second power conversion device, and to control a charging operation or a discharging operation of the battery based on the output power of each of the first power conversion device and the second power conversion device, such that the output power of each of the first power conversion device and the second power conversion device comes close to a respective rated value that maximizes a power conversion efficiency of each of the first power conversion device and the second power conversion device.

4. The power system according to claim 3, wherein when the load consumes power from the first power conversion device and the second power conversion device, the controller charges or discharges the battery based on a difference value between a consumption power of the load and respective rated values of the first power conversion device and the second power conversion device, such that each of the output values of the first power conversion device and the second power conversion device comes close to respective rated values that maximize a power conversion efficiency of the first power conversion device and the second power conversion device.

5. The power system according to claim 3, wherein when the power is exchanged between the first power conversion device and the second power conversion device, the controller charges or discharges the battery based on a difference value between an exchanged power and respective rated values of the first power conversion device and the second power conversion device, such that each of the output values of the first power conversion device and the second power conversion device comes close to respective rated values that maximize a power conversion efficiency of the first power conversion device and the second power conversion device.

6. A power management method for a power system comprising a power conversion device that performs power conversion between a power source and a load that is connected to an output side of the power conversion device, a battery connected to the output side of the power conversion device in parallel with the load, and a controller to control a charging operation or a discharging operation of the battery, the method comprising:

receiving an output power of the power conversion device;

determining a charging power to the battery based on a difference between the output power of the power conversion device and a rated value that maximizes a power conversion efficiency of the power conversion device, and starting the charging operation of the battery based on the determined charging power when the output power of the power conversion device is smaller than the rated value; and determining a discharging power from the battery based on a difference between the output power of the power conversion device and the rated value, and starting the discharging operation of the battery based on the determined discharging power when the output power of the power conversion device is larger than the rated value.

* * * * *